United States Patent
Szabolcs et al.

(10) Patent No.: US 9,221,489 B2
(45) Date of Patent: Dec. 29, 2015

(54) STEERING SYSTEM WITH OVERLOAD PROTECTION

(75) Inventors: Dora Szabolcs, Gyongyos (HU); Imre Benyo, Budapest (HU); Marton Kuslits, Sopron (HU); Sandor Szucs, Parasznya (HU)

(73) Assignee: ThyssenKrupp Presta AG, Eschen (LI)

( * ) Notice: Subject to any disclaimer, the term of this patent is extended or adjusted under 35 U.S.C. 154(b) by 214 days.

(21) Appl. No.: 14/001,114

(22) PCT Filed: Mar. 4, 2011

(86) PCT No.: PCT/EP2011/001071
§ 371 (c)(1),
(2), (4) Date: Aug. 22, 2013

(87) PCT Pub. No.: WO2012/119606
PCT Pub. Date: Sep. 13, 2012

(65) Prior Publication Data
US 2013/0338879 A1    Dec. 19, 2013

(51) Int. Cl.
*B62D 5/04*    (2006.01)
*B62D 6/00*    (2006.01)
*B62D 6/06*    (2006.01)

(52) U.S. Cl.
CPC .............. *B62D 5/0463* (2013.01); *B62D 6/06* (2013.01)

(58) Field of Classification Search
CPC ................................ B62D 6/06; B62D 5/0463
USPC ..................................................... 701/41, 42
See application file for complete search history.

(56) References Cited

U.S. PATENT DOCUMENTS

| 4,762,194 A | 8/1988 | Morishita et al. |
| 4,865,148 A | 9/1989 | Marumoto et al. |
| 4,918,744 A * | 4/1990 | Shimizu ........................ 388/833 |
| 5,530,648 A | 6/1996 | Lavey |
| 2005/0087389 A1 | 4/2005 | Turner et al. |

FOREIGN PATENT DOCUMENTS

| DE | 3821789 A1 | 1/1989 |
| DE | 102005047935 A1 | 4/2007 |

(Continued)

OTHER PUBLICATIONS

International Search Report and Written Opinion issued in PCT/EP2011/001071, mailing date Nov. 30, 2011, with English translation of International Search Report.

(Continued)

*Primary Examiner* — Russell Frejd
(74) *Attorney, Agent, or Firm* — Panitch Schwarze Belisario & Nadel LLP

(57) ABSTRACT

A method for operating an electromechanical steering system for a motor vehicle with variable chassis height, with a steering rack, which is driven by a servo motor through a recirculating ball screw drive, with a control unit, which receives input signals and generates output signals for driving the servo motor, the output signals being representative of an assist torque to be provided by the steering system, may be characterized in that, in operation, the control unit may receive or generate a chassis height signal that may indicate a current chassis height of the vehicle, and may limit the assist torque, on the basis of the chassis height signal, to an upper limit, wherein the upper limit may be decreased with an increase of the difference between the current chassis height and a mean chassis height.

10 Claims, 3 Drawing Sheets

(56) References Cited

FOREIGN PATENT DOCUMENTS

Figure 1:
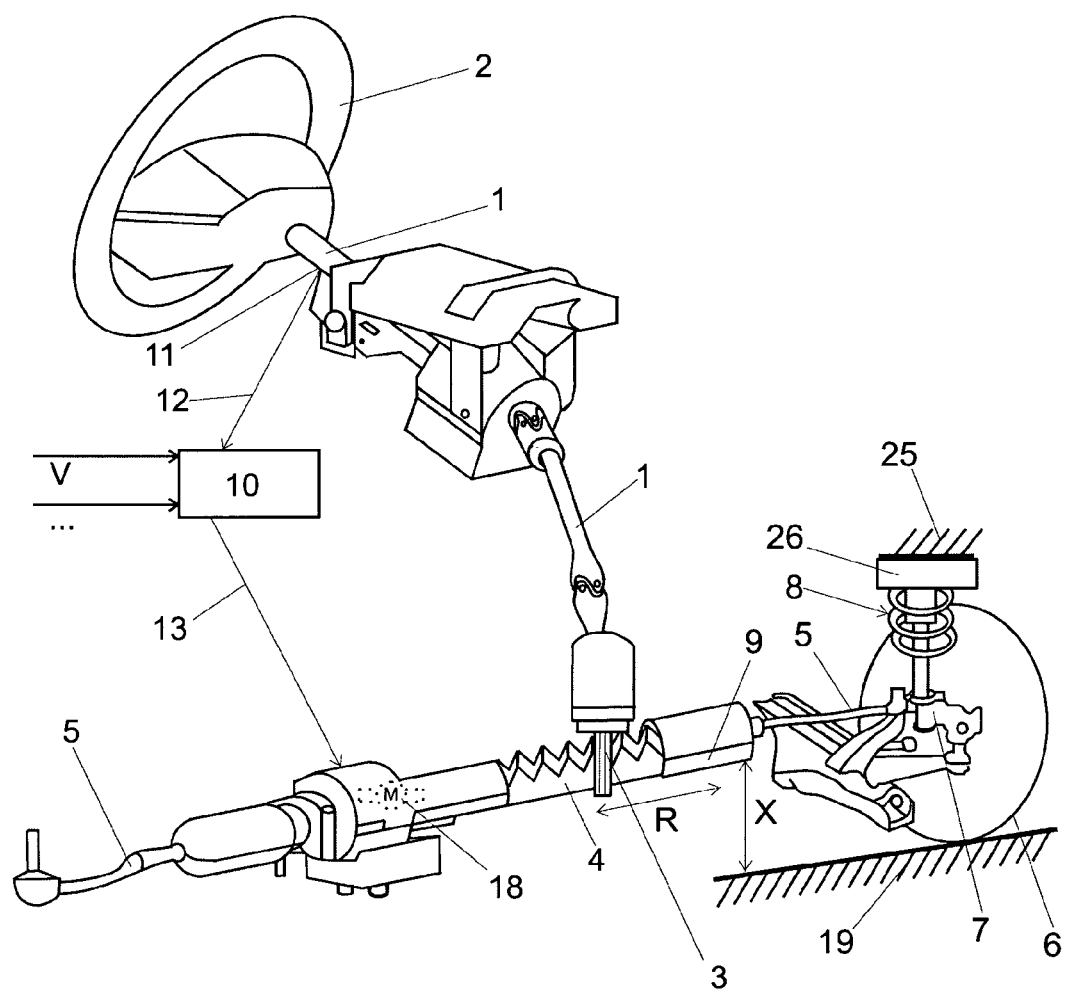

| | | |
|---|---|---|
| JP | 02-296574 | 12/1990 |
| JP | 06-171530 | 6/1994 |

OTHER PUBLICATIONS

International Preliminary Report on Patentability issued in PCT/EP2011/001071, issue date Sep. 10, 2013.

* cited by examiner

STEERING SYSTEM WITH OVERLOAD PROTECTION

CROSS-REFERENCE TO RELATED APPLICATIONS

This Application is a National Stage of PCT International Application No. PCT/EP2011/001071, filed on Mar. 4, 2011. The disclosure of the aforementioned application is incorporated herein in its entirety by reference.

The present invention relates to a method for operating an electromechanical steering system for a motor vehicle with the features of the preamble to claim 1 steering system for a motor vehicle with the features of the preamble to claim 9.

Electrically-assisted power steering systems are known in a design form, in which the steering assistance power is applied directly by means of a re-circulating ball screw drive onto the toothed rack, wherein the toothed rack is provided with a corresponding ball screw. With toothed rack steering systems, the principle is generally known that the connection between the toothed rack and the steered wheels is provided by means of track rods, which are attached at the free ends of the toothed rack. Track roads are sometime called as to tie rods. The track rods are not aligned coaxially to the toothed rack, but occupy an angle to the axis of the toothed rack. Forces which act on the toothed rack from the steered wheels via the track rods thus have an axial component and a radial component in relation to the axis of the toothed rack. The ratio between the radial component and the axial component becomes greater the greater the angle is between the track rod and the longitudinal axis of the toothed rack.

The re-circulating ball screw drive of an electromechanical power steering system is designed in such a way that the torque applied by the electric motor is not able to damage the re-circulating ball screw drive. There are circumstances, however, in which the re-circulating ball screw drive is subjected to a combination of the motor torque and the externally acting forces which in some operating conditions can be so high that damage to the re-circulating ball screw drive cannot be ruled out. Such damage then occurs due to high surface pressure in the area of the re-circulating ball screw surfaces and leads to noise development and a reduced service life.

From the prior art, the principle is known of limiting the assistance capacity of the power drive, in order to rule out damage to the re-circulating ball screw drive. For example, steering systems are known from the German published applications DE 3821789 A1 and DE 102005 047 935 A1, in which the steering assistance is reduced by the electric motor when the steering power generated in the steering system as a whole or the torque applied by the driver on the steering wheel exceed a specified limit value. Such exceeding of the limit value can occur, for example, if one of the steered wheels strikes a fixed obstacle. These steering systems only reduce the assistance power after a specified limit value has been exceeded. If exceeding of the limit value occurs rapidly damage to the drive components of the servo drive can nevertheless arise. In particular, these systems do not take account of the geometry of the steering system, in particular the influence of the track rods located at an angle to the toothed rack. In the real driving situation this angle is also significantly influenced by the height of the chassis as result of the spring deflection of road wheels ore steered wheels. This variable chassis height could be named as biasing chassis height. Another form of variable chassis height could be an adjustable chassis height, as example for more sporting drive on high way or better outdoor drive on cart-road. For vehicles with adjustable chassis heights, this angle is also significantly influenced by the height setting selected. This influence is not taken into account in the steering systems referred to.

There are steering systems in which the springing or suspension of the vehicle is influenced by the steering. Such systems are known from the U.S. Pat. No. 4,865,148 and U.S. Pat. No. 5,530,648. No overload protection for the steering systems is known from these publications.

The U.S. Pat. No. 4,762,194 describes a vehicle with height sensors for the chassis, wherein conclusions are made on the driving condition of the vehicle from the signals from the height sensors. From high signal dynamics from the height sensors, it is concluded that the vehicle is moving over uneven terrain. Under these conditions, the steering assistance is reduced, in order to avoid unwanted movements. Precautionary measures for avoiding damage to the steering system are not provided.

The object of the present invention is, therefore, to provide a steering system for a vehicle with variable chassis height, in which damage to the transmission components, and in particular to the re-circulating ball screw drive, can be avoided with greater reliability.

This object is achieved by a method with the features of claim 1 and a steering system with the features of claim 9.

Because in a method for operating an electromechanical steering system for a motor vehicle with variable chassis height, with a steering rack, which is driven by a servo motor through a re-circulating ball screw drive, with a control unit, which receives input signals and generates output signals for driving the servo motor, the output signals being representative of an assist torque to be provided by the steering system, the steering assistance power is limited as a function of the chassis height, it is possible for operational conditions to be identified and taken into account, in which potentially high radial forces act on the re-circulating ball screw drive, and to limit the steering assistance power before an overload state occurs. Exceeding the limit value, as is required in the prior art to limit the motor current of the servomotor, does not then as a rule occur at all.

The invention is applicable for an adjustable chassis height and/or for a biasing chassis height.

Preferably, the steering system is also controlled as a function of the speed of the vehicle, wherein provision can be made for a reduction of the support torque at low speeds, since at these speeds high radial forces can occur. Provision can also be made for maximum motor torque values to be calculated, as a function of the toothed rack in the direction of their longitudinal axis, since in this way particularly unfavourable angles between the toothed rack and the track rods in the area of the end contact points of the steering system can be taken into account.

In a preferred embodiment, the electric motor is subjected to a motor current, the value of which lies between the maximum current value, calculated on the basis of the steering torque at the steering wheel, and the current value limited on the basis of the chassis height, the position of the toothed rack and/or the vehicle speed.

This mean value is preferably a weighted mean value, wherein the weighting is applied on the basis of the vehicle speed.

Provision can further be made for the position of the toothed rack to be measured or calculated during limitation of the steering assistance and for a case to be recognised, in which the toothed rack is displaced against the control due to external forces. In this case, preferably after termination of the overload state, the toothed rack is automatically moved into the position which existed at the beginning of the overload state.

Furthermore, the object is achieved by an electromechanical steering system for a motor vehicle with variable chassis height, with a steering rack, which is driven by a servo motor through a re-circulating ball screw drive, with a control unit, which receives input signals and generates output signals for driving the servo motor, the output signals being representative of an assist torque to be provided by the steering system. Because the control unit comprises means to receive or generate a chassis height signal indicative of the chassis height of the vehicle, and means to adjust the assist torque as a function of the chassis height signal, the assist torque provided by the servo motor can effectively be limited to prevent damage of the gearing, namely of the ball screw drive, by high radial forces.

The steering system preferably comprises means to limit the assist torque on the basis of the vehicle speed and/or of the rack position, as described above.

Figure 2:
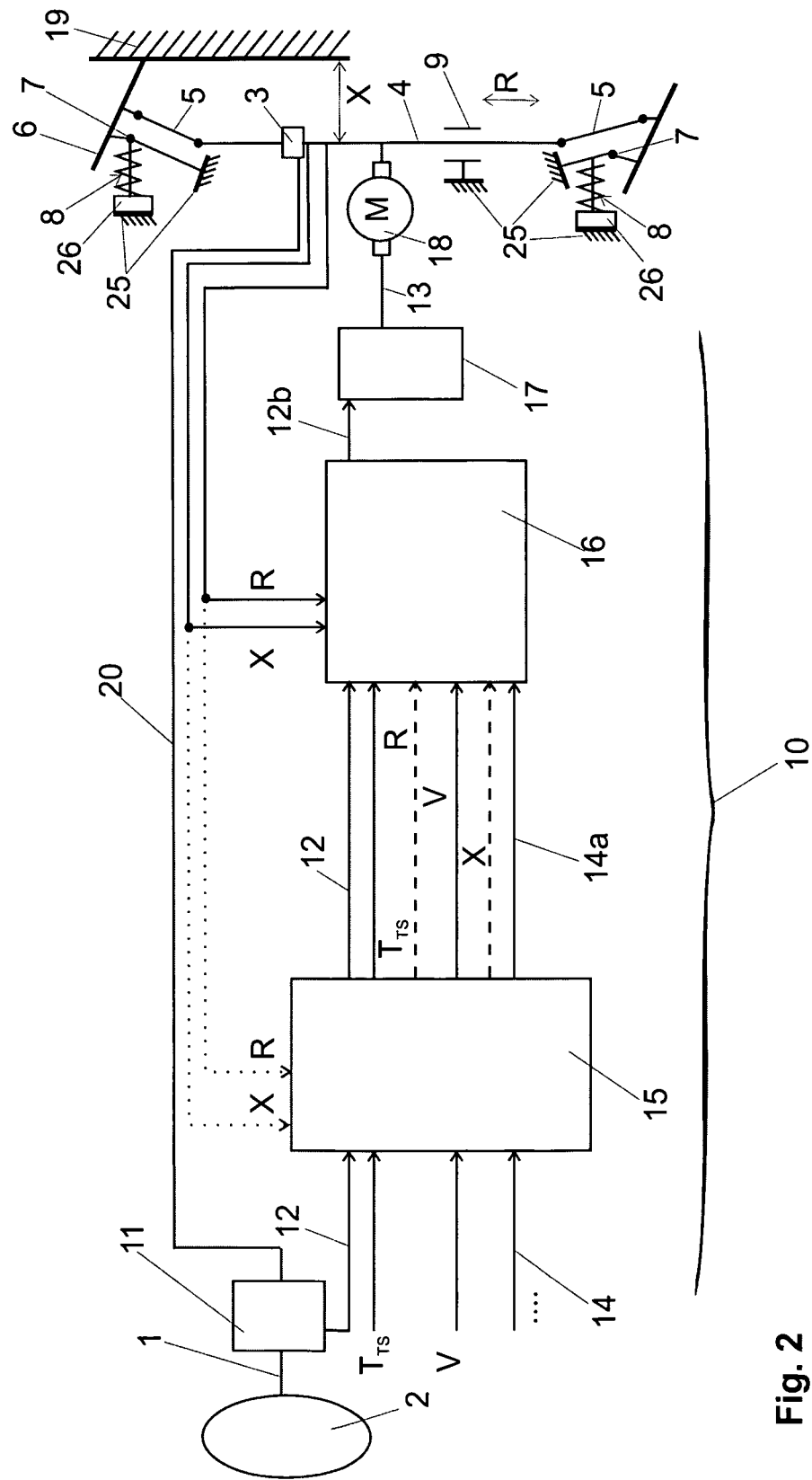
Figure 3:
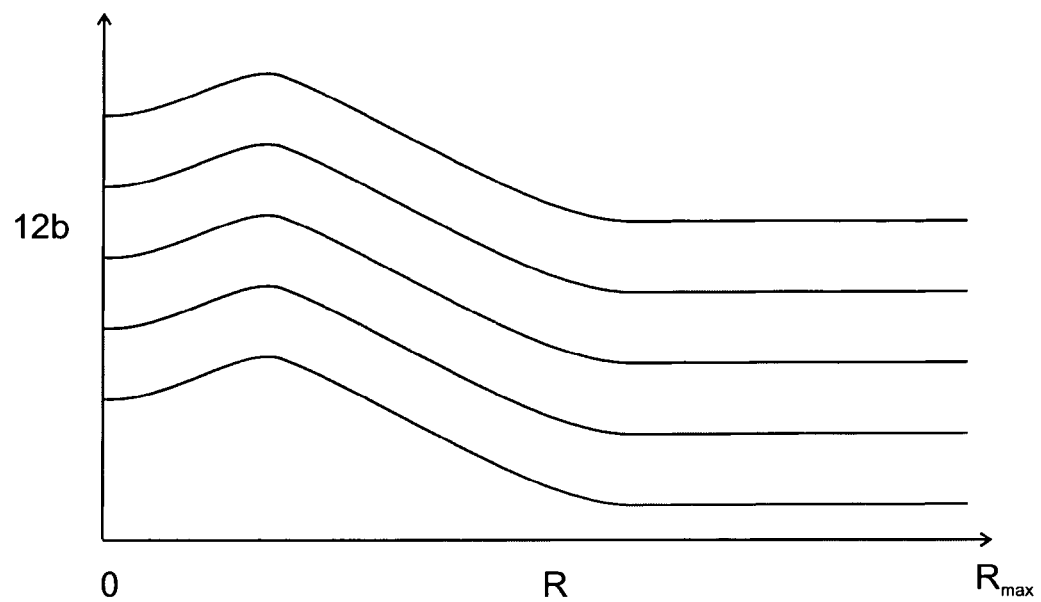
Figure 4:
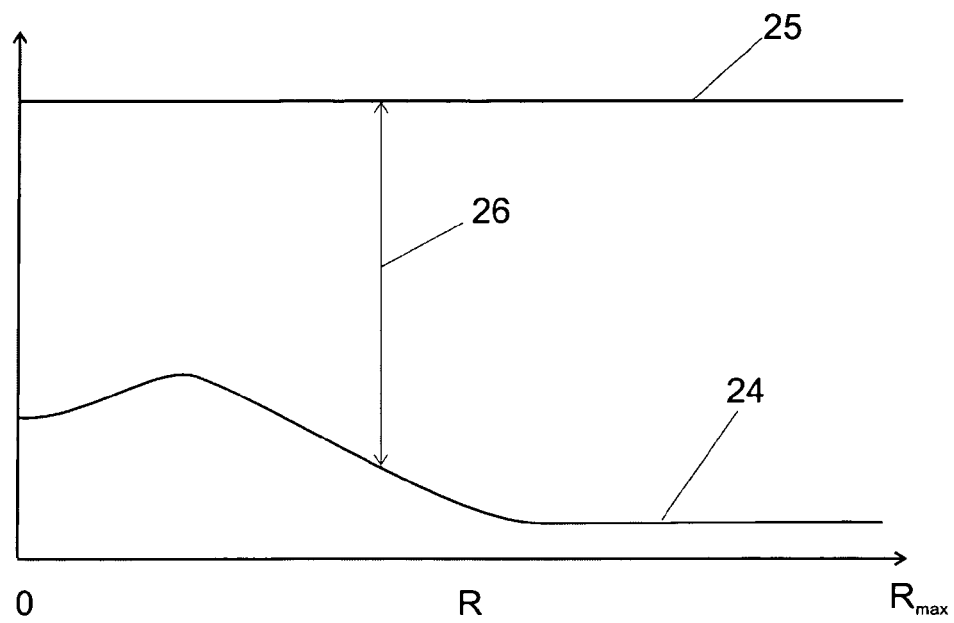

Exemplary embodiments of the present invention are described in greater detail below on the basis of the drawing, in which:

FIG. 1: shows a steering system for a motor vehicle in a diagrammatic representation;

FIG. 2: shows the control arrangement for the steering system from FIG. 1 in a block diagram;

FIG. 3: shows a set of regulating curves for the maximum motor torque as a function of the deflection of the toothed rack and for different chassis heights and FIG. 4: shows an example for the calculation of the actual limit value for the motor torque as a mean value between a fixed upper limit and a lower limit value calculated on the basis of the chassis height.

FIG. 1 shows in diagrammatic form a steering system for a motor vehicle with a steering shaft 1, which at its upper end holds a steering wheel 2 and at its lower end a steering pinion 3. The steering pinion 3 meshes with the teeth of a toothed rack 4, so that, when the steering wheel 2 is turned, the toothed rack 4 is displaced in its axial direction. The rack is guided in a rack housing 9 which is fixed to the vehicle structure 25 respective the vehicle chassis. Track rods 5 are attached to both ends of the toothed rack 4 and are connected to steering knuckles 7, which in turn carry steered wheels 6. A rotation of the steering wheel 2 thus leads, in a known manner, to pivoting of the steered wheels 6. The steered wheels 6 contact the road surface 19. A MacPherson strut unit 8 or a similar biasing and damping unit, fixed to the vehicle structure 25 respective the vehicle chassis, allows a linear movement of steered wheels 6 to improve the comfort of driver, damping the road surface relief's. By this linear movement the distance between the road surface 19 and the rack 3 and between the road surface 19 and the rack housing is changing. In other words the chassis height X is changing and this is meaning the chassis height X is variable. Additional it is also possible to adjust the distance between the rack 3 and the road surface 19 with adjusting means 26, what is also covered by the meaning the chassis height X is variable. This would one of the important objects to provide for such adjustable chassis an adopted overload damping method and an adequate device.

Because the steered wheels could bias different the local chassis height at any steered wheel could be also different. The chassis height could be determined as an average value of such different local chassis height. In the preferred solution the chassis height is determined as to the minimal value of all local chassis height values at any steered wheel. This minimal local chassis height determines the most critical angle situation in the driving device and following the forces introduced into the steering device. In some steering devices could a large chassis height and a low chassis height the critical height in view of steering forces. In such steering devices the biggest absolute value of the difference between any local chassis height and the during the vehicle design designed standard chassis height is determined as to the chassis height in the meaning of this invention.

A control unit 10 receives signals from a torque sensor 11 via a signal line 12, wherein the torque sensor 11 is arranged between the steering wheel 2 and the steering pinion 3 and measures the torque acting on the steering wheel 2. The control unit 10 further receives different signals from sensors of the vehicle, such as a speed signal V and a signal which reproduces the height X of the vehicle chassis. Via a signal line 13, the control unit 10 actuates a servomotor 18 which is actuated with the corresponding control signal. The servomotor 18 acts via a re-circulating ball screw drive on the toothed rack 4 and causes a displacement in the axial direction. The position of the toothed rack in the axial direction is identified by R. The manual torque initiated by the driver via the steering wheel 2 and the assistance torque produced by the electric motor 18 cause the steered wheels 6 to pivot against the frictional and restoring forces which are caused by the road surface 19.

FIG. 2 represents a block diagram of a steering system according to the invention, in a particularly preferred exemplary embodiment. The same components as in FIG. 1 have the same reference figures.

The control unit 10 from FIG. 1 comprises several components which are represented separately in FIG. 2. The components here are a status observer 15, a regulator 16 and a motor control unit 17 for direct actuation of the servomotor 18.

The status observer 15 receives input signals, such as the manual torque $T_{TS}$, from the torque sensor 11 via the input line 12, a speed signal V, and possibly other signals via the signal line 14, which may derive from other sensors. Such signals can derive, for example, from acceleration sensors, assistance systems or the like.

The status observer 15 passes on a number of signals to the regulator 16. The signals which are passed on can be unchanged, such as, for example, the speed signal V. They can, however, also have been changed during processing in the status observer 15, so that an output signal 14a is obtained from an input signal 14. The status observer 15 can also generate signals itself which can be obtained from a vehicle model, which is stored in the status observer 15, with the incoming measured values. Thus, for example, a signal R can be obtained for the position of the toothed rack, even if no particular dedicated sensor detects the current position of the toothed rack. The current height X of the vehicle chassis can accordingly be calculated in the observer 15 from other measured values. The signals obtained in this way are forwarded to the regulator 16. The regulator 16 then calculates a preset value 12b which is output to the motor control unit 17. The motor control unit 17 then actuates the servomotor 18 on the basis of the preset value 12b in such a way that the servomotor 18 produces precisely the desired torque value. Embodiments are also provided, in which the observer 15 can be dispensed with. In these cases, the regulator 16 receives the required sensor signals directly, in particular as is illustrated in FIG. 2 with continuous lines, the sensor signals R for the current position of the toothed rack and X for the current height of the vehicle chassis.

The regulator 16 takes account of the values R and X, measured directly or provided by the status observer 15, in order to calculate, depending on these values, the maximum permissible torque of the electric motor 18 and limit it. The result of this calculation is a group of characteristic values which is represented in FIG. 3, by way of example, by means of a set of curves.

FIG. 3 thus shows, in a diagram, different curves for reference torque values which can be delivered as the control signal 12b by the regulator 16 to the motor control unit 17. The abscissa (x-axis) reproduces the value R, i.e. the displacement of the toothed rack out of the middle position. The value R=0 corresponds to the middle position and hence designed to motor vehicle travelling straight ahead. The maximum value Rmax corresponds to the steering stop of the motor vehicle steering system on chassis which are usually designed to be geometrically symmetrical in both directions, and the same curve can be used for the steering deflection to the right and to the left.

Entered on the ordinate (y-axis) is the reference torque value, i.e. the value 12b. Five different curves are illustrated in total, which represent 5 different chassis heights X of the motor vehicle. These curves are explained in greater detail below.

The aim of the regulation is to reduce or limit the motor torque in steering geometries which give reason to expect high radial loading of the re-circulating ball screw drive. These loadings are correlated with a large angle between the direction of the track rod 5 and the longitudinal axis of the toothed rack 4. On vehicles with height-adjustable chassis, the steering arrangement is usually implemented so that the angle between the toothed rack 4 and the track rod 5, with a middle height setting and travel straight ahead, as R=0, is relatively small. This position is particularly favourable for the transmission of the steering forces. If the height of the chassis is reduced or increased, then the angle between the track rod 5 and the toothed rack 4 also changes, so that the radial component of the steering forces acting upon the steering rack and the ball screw drive increases. The radial component also increases if the toothed rack 4 is displaced out of its mid-position R=0. The more unfavourable, i.e. the greater, the angle is between the toothed rack 4 and the track rod 5, the greater the limitation of the motor torque of the servomotor 18 should be. This is reflected by the curves 20 to 24 in FIG. 3.

The upper curve 20 is provided for the kinematically most favourable height setting of the chassis height X. At this height setting, in the mid-position R=0 of the toothed rack 4, a high control value 12b is output. When the toothed rack begins to deflect, i.e. with small steering angles, this value initially rises. From the maximum value, which is attained approximately at a toothed rack deflection R=20 mm, the control value 12b falls again, and specifically up to a deflection of about R=60 mm. From this value, the control value 12b remains constant until the end stop is reached, which is designated as Rmax. The rise on the first 20 mm of the movement path is intended to make steering in the straight-ahead position a little heavier, which many drivers prefer.

A second curve 21 is identical to the curve 20 in its course. It is, however, about 20% lower than the curve 20. The curve 21 can correspond, for example, to a reduction in the chassis height X by 20 mm in relation to the normal position. The geometry of the steering arrangement, i.e. the angle between the track rod 5 and the toothed rack 4, in this chassis setting is a little more disadvantageous than in the normal position, to which the curve 20 applies. The control signal 12b of the curve 21 is therefore a little below the curve 20.

The curve 22 can be provided for a chassis position in which the chassis is raised in relation to the normal position by, for example, 50 mm. The torque values, which are represented by the control signal 12b, have a similar course but are again reduced in relation to the curve 21. The curve 23 can correspond to a lowering of the chassis of 80 mm. The geometry of the track rods is in this case very unfavourable and produces high radial forces, so that there is an increased reduction in the control signal 12b again. The curve 24 can, finally, for example in off-road vehicles, correspond to a raising of the chassis by 150 mm. With this increase in the value X, the track rods have a large angle in relation to the toothed rack 4, which can bring about particularly high radial forces. The control value 12b is therefore substantially lowered, in particular with large steering deflections, so that no excessive radial forces can act on the re-circulating ball screw drive.

The control signals from FIG. 3 can be calculated as factors directly with the torque requirement signal from the torque sensor 11, for example as a factor in a multiplication.

Another type of calculation is illustrated in FIG. 4. FIG. 4 shows, in the same illustration as FIG. 3, a characteristic line, in this case the characteristic line 24 for a particularly high raised chassis position, and a nominal value which corresponds to the assistance torque, which calculates at the torque sensor 11 the assistance provided based on the manual torque. The regulating value 12b actually output is an intermediate value, which is calculated as a weighted mean value between the nominal value and the curve 24. The weighting in the calculation is, preferably, speed-dependent, so that, for example, at high speeds the mean value rather corresponds to the nominal value, since at high speeds only low toothed rack forces are to be expected. At low speeds, the weighting is rather displaced in the direction of the curve 24, since at low speeds with elevated chassis heights it can be assumed that off-road driving is carried out with a raised chassis, and therefore high radial forces on the toothed rack are to be expected. In the embodiment described, this weighting effectively means that a speed-dependent component is incorporated into the calculation of the signal 12b which is actually delivered to the motor control unit.

REFERENCE NUMBER LIST

1. Steering shaft
2. Steering wheel
3. Steering pinion
4. Toothed rack
5. Track rod
6. Wheels
7. Knuckles
8. MacPherson strut unit
9. Rack housing
10. Control unit
11. Torque sensor
12. Signal line
12b. Signal line
14. Signal line
15. Status observer
16. Regulator
17. Motor control unit
18. Servomotor
19. Road surface
20. Curve
21. Curve
22. Curve
24. Characteristic line
25. Vehicle structure
26. adjusting means

What is claimed is:

1. A method for operating an electromechanical steering system for a motor vehicle with variable chassis height, the electromechanical steering system including a steering shaft having a steering wheel at an upper end of the steering shaft and a steering pinion at a lower end of the steering shaft, a toothed steering rack, which is configured to be driven by a servo motor through a re-circulating ball screw drive, wherein the steering pinion meshes with teeth of the toothed steering rack, and a control unit configured to receive input signals and to generate output signals for driving the servo motor, the output signals being representative of an assist torque to be provided by the steering system, the method including:

receiving or generating, by the control unit, a chassis height signal indicative of a current chassis height of the vehicle, and limiting the assist torque, on the basis of the chassis height signal, to an upper limit, wherein the upper limit is decreased with an increase of a difference between the current chassis height and a mean chassis height.

2. The method of claim 1, wherein limiting the assist torque is performed at least in part as a function of a speed of the vehicle.

3. The method of claim 1, further comprising reducing a support torque at low speeds.

4. The method of claim 1, wherein limiting the assist torque is performed at least in part as a function of a displacement of the toothed steering rack from a center position.

5. The method of claim 1, further including subjecting the servo motor to a motor current, with a value that lies between a maximum current value, calculated only on the basis of the steering torque at a steering wheel, and a second current value limited on the basis of the chassis height signal, a position of the toothed steering rack and/or vehicle speed.

6. The method of claim 5, wherein the value of the motor current is a mean value between the maximum current value and the second current value.

7. The method of claim 6, wherein the mean value is a weighted mean value, wherein the weighting is applied on the basis of the vehicle speed.

8. The method of claim 1, further including: measuring or calculating a position of the toothed steering rack during limitation of steering assistance, and providing for recognition of an overload state, in which the toothed steering rack is displaced against a control, due to external forces.

9. The method of claim 8, further including automatically moving the toothed steering rack, into a position in which the toothed steering rack existed at the beginning of the overload state.

10. An electromechanical steering system for a motor vehicle with variable chassis height, the steering system including:

a steering shaft having a steering wheel at an upper end of the steering shaft and a steering pinion at a lower end of the steering shaft;

a toothed steering rack, wherein the toothed steering rack is configured to mesh with the steering pinion;

a servo motor coupled to drive the toothed steering rack through a re-circulating ball screw drive; and a control unit configured to receive input signals and to generate output signals for driving the servo motor, the output signals being representative of an assist torque to be provided by the steering system, the control unit being further configured to receive or generate a chassis height signal indicative of a current chassis height of the vehicle, and to adjust an upper limit of the assist torque as a function of the chassis height signal, wherein the upper limit is decreased with an increase of a difference between the current chassis height and a mean chassis height.

* * * * *